No. 763,832. PATENTED JUNE 28, 1904.
O. A. ALBRECHT & T. L. RINGWALT.
LACE TIPPING MACHINE.
APPLICATION FILED DEC. 30, 1902.
NO MODEL. 5 SHEETS—SHEET 2.

Witnesses

Inventors
O. A. Albrecht,
T. L. Ringwalt,
By Victor J. Evans
Attorney

No. 763,832. PATENTED JUNE 28, 1904.
O. A. ALBRECHT & T. L. RINGWALT.
LACE TIPPING MACHINE.
APPLICATION FILED DEC. 30, 1902.
NO MODEL. 5 SHEETS—SHEET 3.

Witnesses
Inventors
O. A. Albrecht,
T. L. Ringwalt
By Victor J. Evans
Attorney

No. 763,832. PATENTED JUNE 28, 1904.
O. A. ALBRECHT & T. L. RINGWALT.
LACE TIPPING MACHINE.
APPLICATION FILED DEC. 30, 1902.
NO MODEL. 5 SHEETS—SHEET 4.
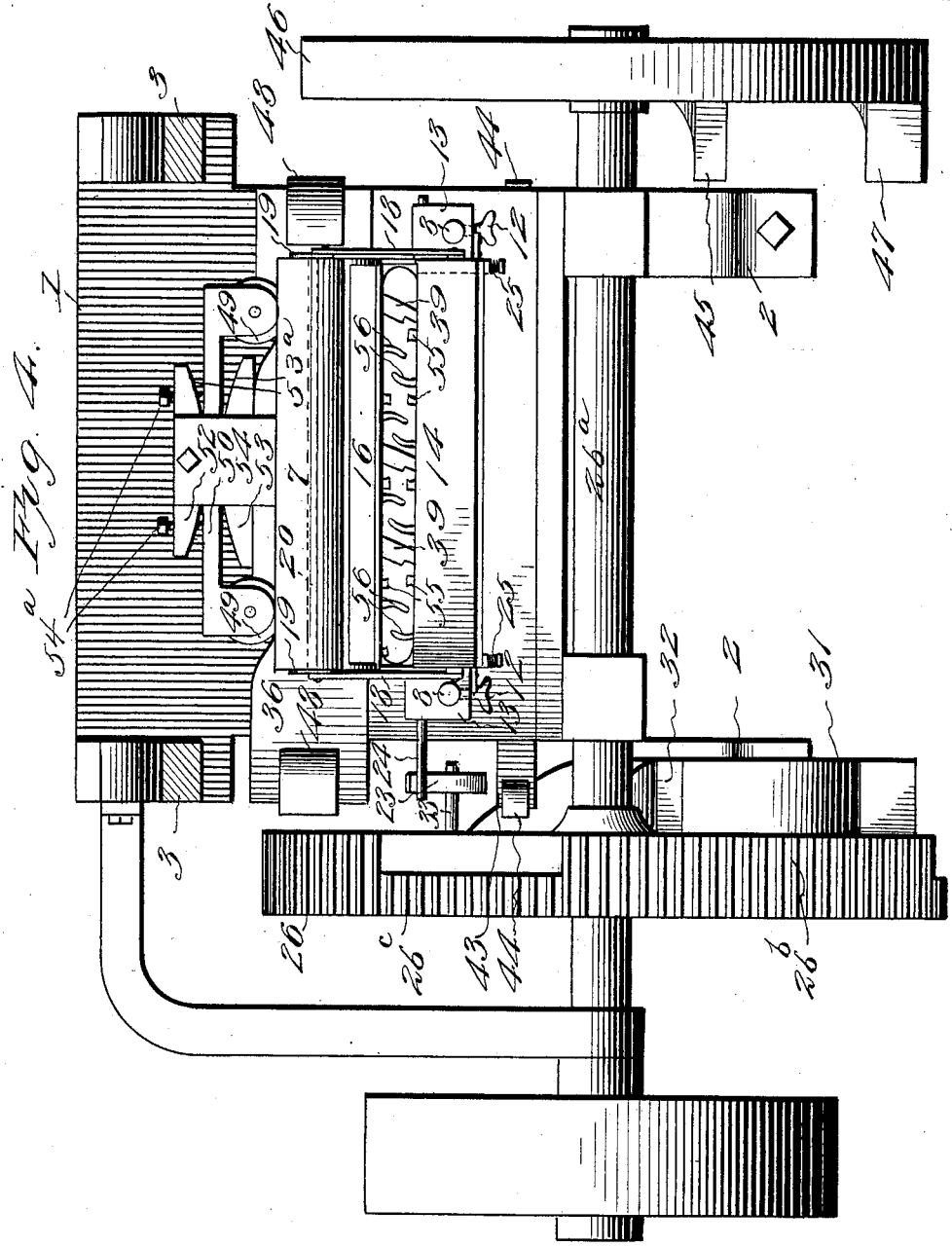
Witnesses
Inventors
O. A. Albrecht
T. L. Ringwalt,
By Victor J. Evans
Attorney

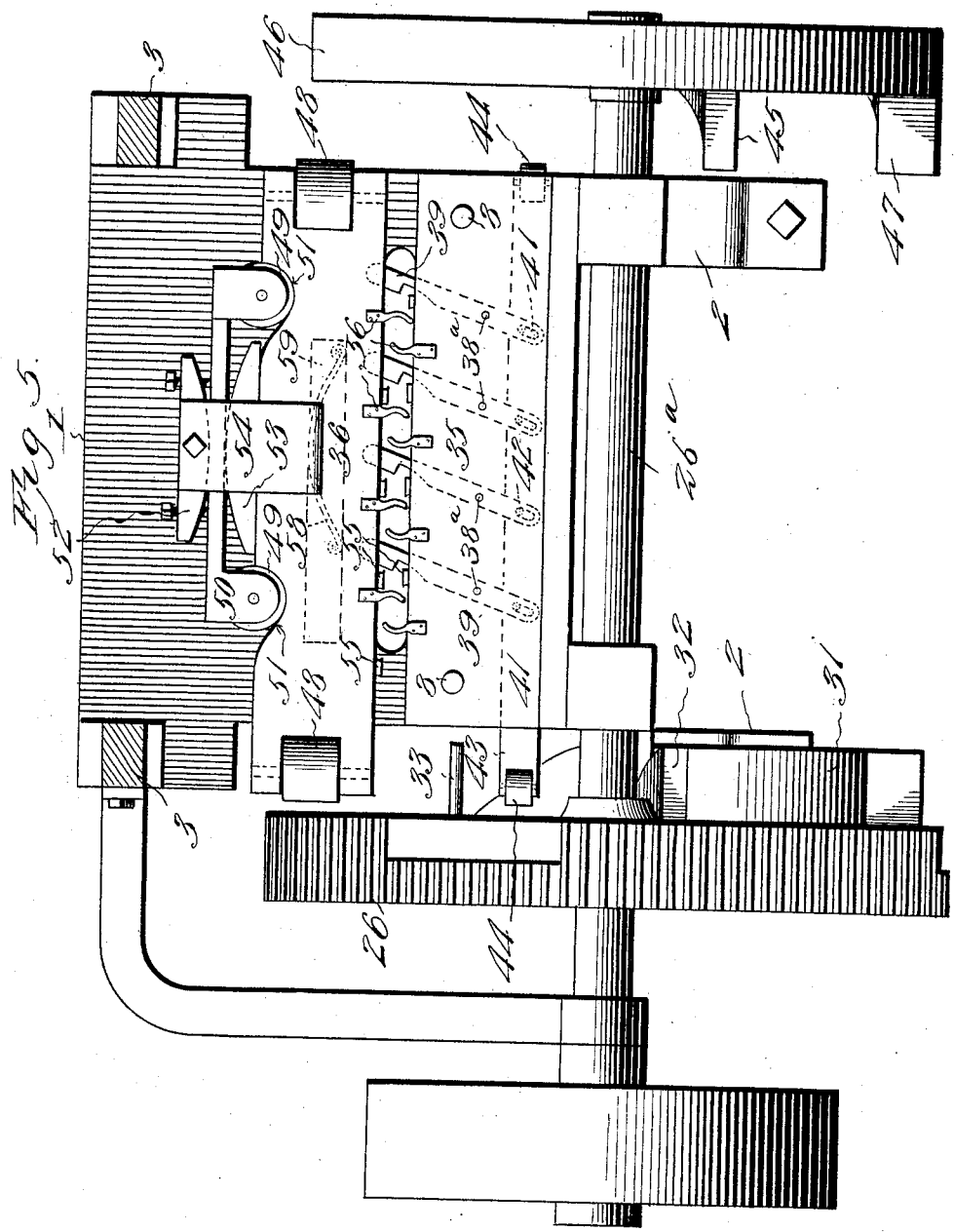

No. 763,832. Patented June 28, 1904.

UNITED STATES PATENT OFFICE.

OSCAR A. ALBRECHT AND THEODORE L. RINGWALT, OF OMAHA, NEBRASKA, ASSIGNORS TO O. A. ALBRECHT COMPANY, A CORPORATION OF NEBRASKA.

LACE-TIPPING MACHINE.

SPECIFICATION forming part of Letters Patent No. 763,832, dated June 28, 1904.

Application filed December 30, 1902. Serial No. 137,164. (No model.)

*To all whom it may concern:*

Be it known that we, OSCAR A. ALBRECHT and THEODORE L. RINGWALT, citizens of the United States, residing at Omaha, in the county of Douglas and State of Nebraska, have invented new and useful Improvements in Lace-Tipping Machines, of which the following is a specification.

Our invention is a machine for the manufacture of shoe and analogous laces, and especially for forming the tips for the laces from a portion of the lace which has been saturated or impregnated with a substance which hardens to form the tip.

The invention consists of the novel construction and arrangement of the various elements and mechanisms in operative combination, to be more fully described hereinafter, and the novelty of which will be particularly pointed out and distinctly claimed.

We have fully and clearly illustrated our invention in the accompanying drawings, forming a part of this invention, and wherein—

Figure 1:
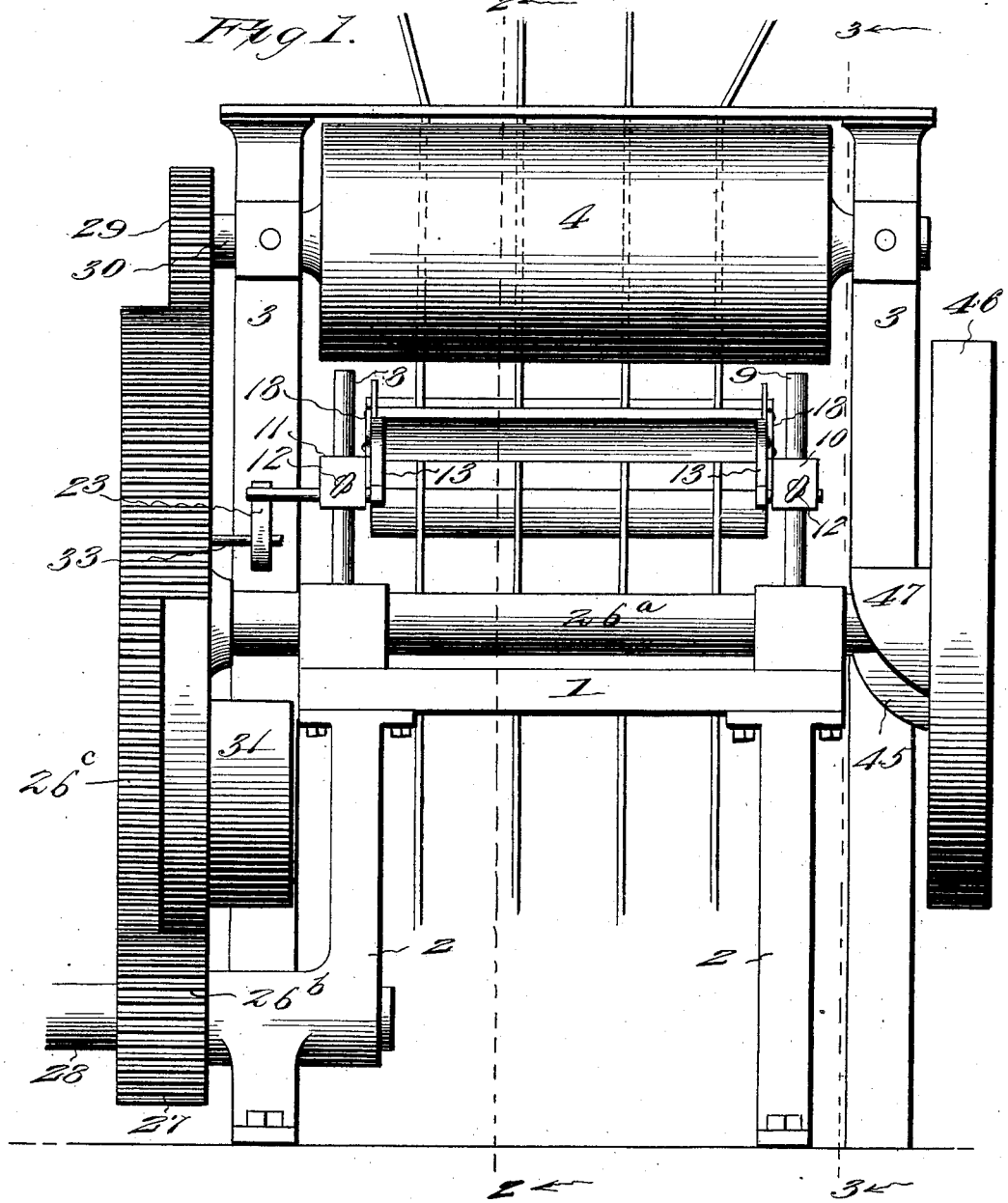
Figure 2:
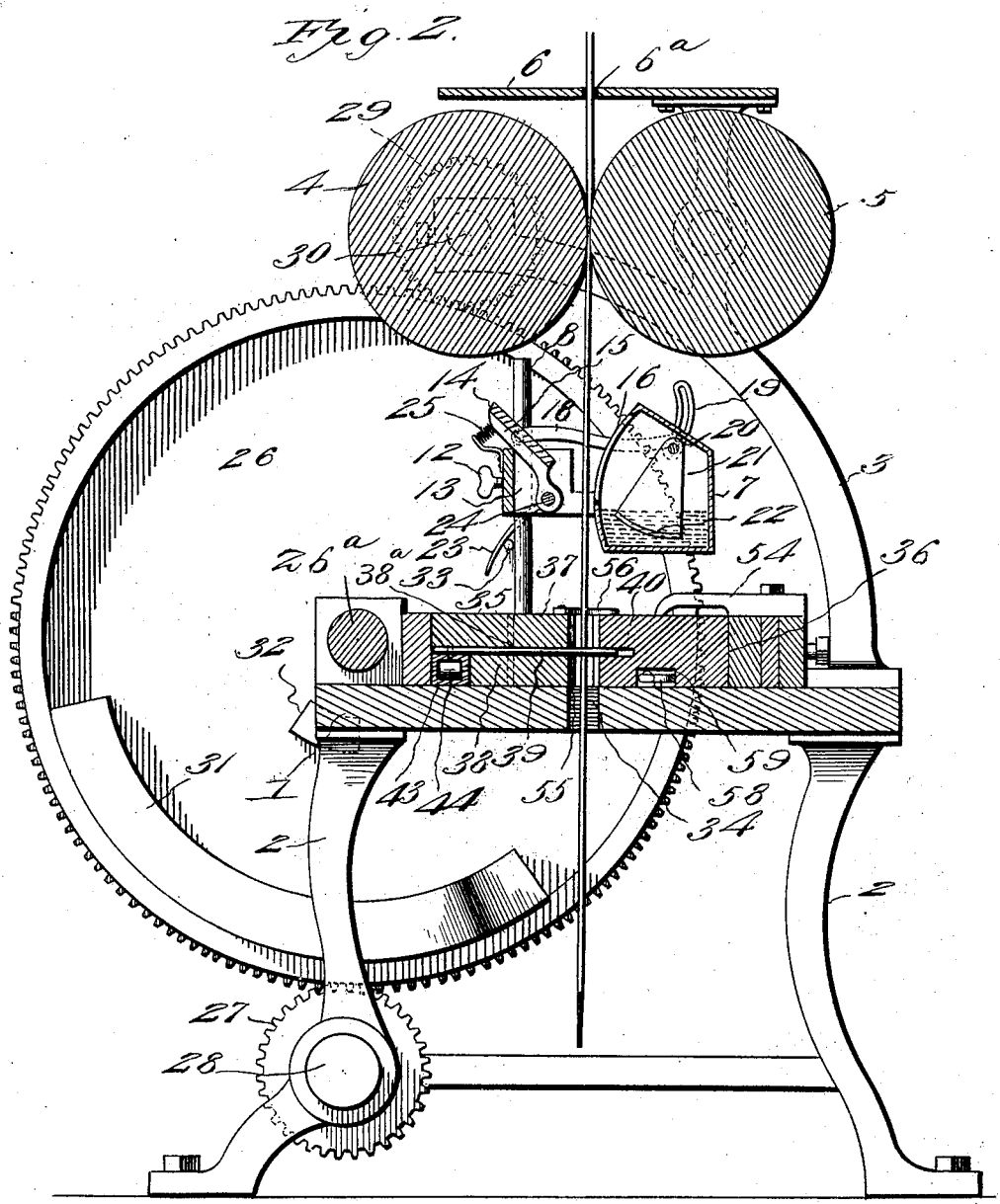
Figure 3:
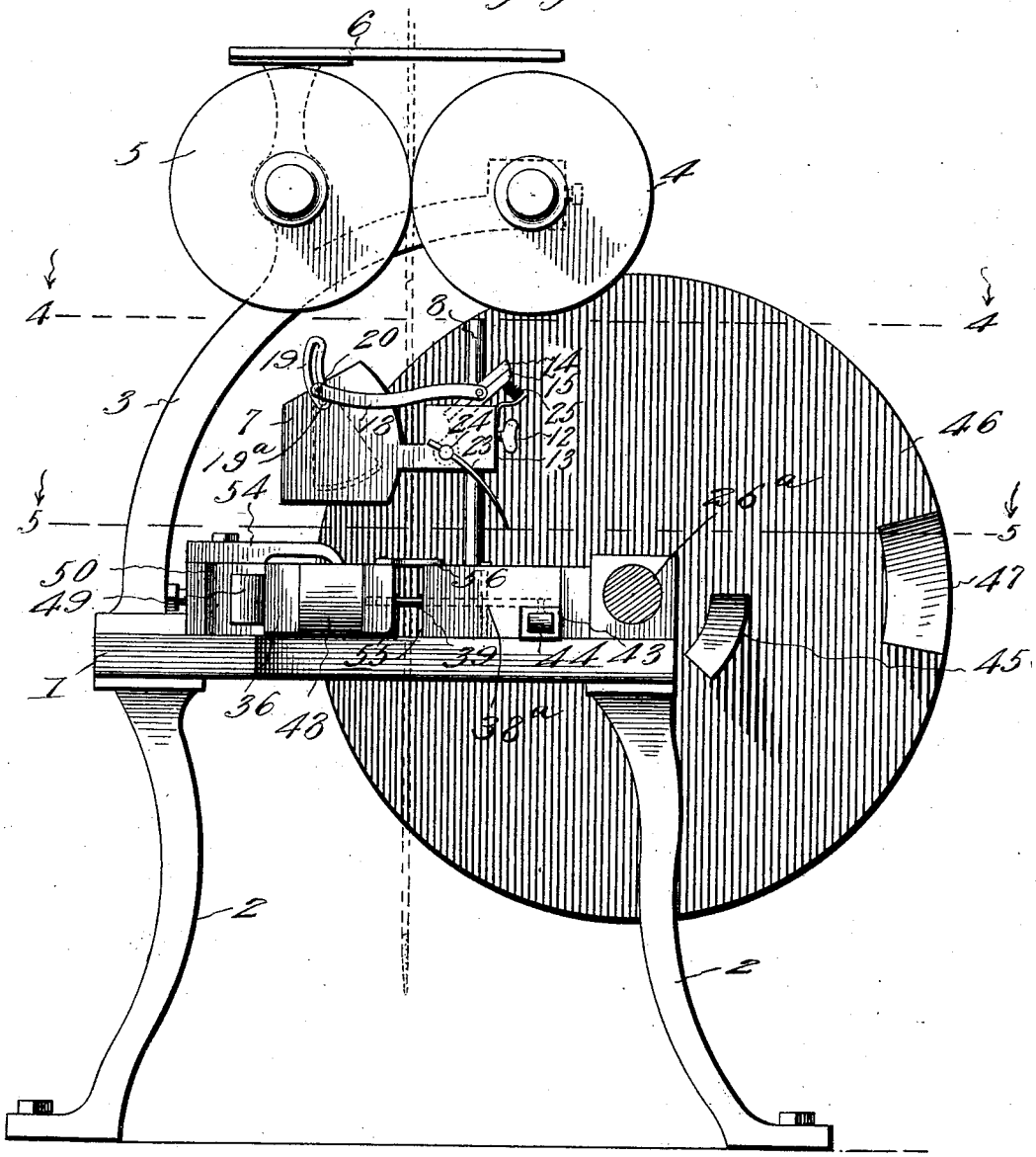

Figure 1 is a front elevation of a lace-tipping machine constructed in accordance with our invention. Fig. 2 is a vertical cross-sectional view of the lace-tipping machine, taken on line 2 2 of Fig. 1. Fig. 3 is a like view taken on line 3 3 of Fig. 1. Fig. 4 is a horizontal cross-sectional view of the preferred form of the lace-tipping machine on the line 4 4 of Fig. 5. Fig. 5 is a horizontal sectional view on the line 5 5 of Fig. 3.

Referring to the drawings, 1 designates a base or supporting frame, which is supported upon legs or standards 2 and upon which the various working elements of the invention are assembled in operative combination. Securely and rigidly fastened to the base 1 and closely adjacent one edge thereof are substantially parallel arms or standards 3, which are curved upwardly over the base 1 and support at their upper portions parallel contacting feed-rollers 4 5, which are journaled in bearings mounted on the said arms or standards. Also supported by the arms or standards 3 is a guide-plate 6, which is arranged over the above-mentioned rollers and has formed therein a plurality of apertures $6^a$, constituting guides through which the strands from which the laces are to be formed are fed to the machine. These guides are so spaced apart that each strand will be properly guided between the feed-rollers 4 and 5 to be operated upon by the mechanism, which will be described hereinafter, for saturating a portion of the lace with the substance from which the tip is formed, forming the tips, and cutting the strand into laces of desired length.

Arranged below the feed-rollers 4 and 5 and adapted to receive the strands fed therefrom is a saturating mechanism by means of which the adhesive substance is applied to the strand to form the tip. This mechanism comprises a liquid-receptacle 7, which extends transversely of the machine and is adjustably supported upon vertical posts or standards 8 by means of perforated blocks 10 and 11, mounted upon opposite ends of the receptacle and through which the said posts extend, the receptacle being vertically movable and the said blocks being provided with suitable clamps, such as thumb-screws 12, whereby the receptacle may be secured at the proper height on the posts with relation to the forming means to regulate the length of laces to be made. The receptacle 7 is spaced away from the standards or posts 8 and 9 by two parallel horizontal arms 13, which are extensions of the blocks 10 11, substantially as shown in the drawings.

Pivotally mounted in the blocks 10 11 or the arms 13, as may be preferred, is a transverse shaft 24, upon which is rigidly mounted an oscillating platen 14, which is provided with a flat surface 15, running parallel to the transverse tank or receptacle 7, in the face of which toward the platen is formed a longitudinal opening 16, through which the adhesive substance is drawn or projected, by the means to be hereinafter described, to saturate the lace-strand, which in its course through the machine passes between said platen and receptacle.

Pivotally secured to each end of the platen is a link-lever 18, which at its free end is provided with a laterally-projecting pin 20, which engages within a slotted arm 19, rigidly mounted on the end of a shaft 19ª, which is journaled in the ends of the adhesive-receptacle 7 and upon which are rigidly secured depending arms 21, which carry a moistening pad or member 22, which is normally immersed in the liquid in the receptacle. The connection made between the platen 14 and the pad 22 by means of the lever 18 and arm 19 is such that said platen and member may be swung toward each other to bring their surfaces together simultaneously by an upward force exerted upon the arm 23, which is rigidly fixed to the end of the shaft 24 on which the platen 14 is arranged, in order to saturate by compression a lace passing between said platen and pad. The platen and saturating pad or member 22 will be caused to assume their normal or retracted positions, as shown in Fig. 2, by a retractile spring 25, one end of which is connected to the platen and the other end to the support for the platen.

26 designates a gear-wheel mounted on one end of a shaft 26ª, extending transversely of the machine and journaled in suitable bearings thereon. This gear has on its periphery a series of interrupted teeth—that is, a series which only extends a portion of the distance around the wheel—said series being arranged on one side of the middle line of the circumferential surface of the wheel, as at 26ᵇ, the opposite side being provided with an uninterrupted series of teeth 26ᶜ. The uninterrupted series of teeth are arranged in mesh with a pinion 27, driven by a power-shaft 28, to which it is keyed, so that a continuous motion will be imparted to the gear 26 when the machine is in operation. The interrupted series of teeth are arranged to engage a pinion 29, which is rigidly mounted on the end of the shaft 30, upon which the feed-roller 20 is fastened. It will be seen that by this arrangement of gearing for actuating the rollers constituting the feeding mechanism the said mechanism will be intermittently operated to feed the lacing-string to the saturated mechanism and that the said string will be held stationary while being saturated and the part previously saturated is being molded to form a tip and cut.

The length of the tape to constitute each lace is determined by the distance the saturating mechanism is adjusted from the forming and cutting means—i. e., the farther said mechanism is placed from the said means the longer the lace will be. It will be seen that in determining the length of laces a certain or determined length of the tape must be introduced by the feeding mechanism, which length is regulated by the number of revolutions made by the feed-rollers in feeding the tape. To regulate said revolutions, we make the gear-wheel 26 readily detachable from its shaft and substitute therefor another gear-wheel which is of similar construction to the wheel 26, but of greater or less circumference, accordingly as it is desired to increase or shorten the length of tape.

Near the periphery of the gear-wheel 26 and on the inner face thereof is an elongated curved cam 31, while a similar concentric short cam 32 is arranged on said wheel 26 near the shaft 26ª, said cams operating as hereinafter described. On the inner face of the gear is also arranged a pin 33, which is so positioned as to engage the arm 23 on the platen-shaft to actuate the lace-saturating mechanism to saturate the string as it is fed from the feed-rollers 4 and 5.

In the bed-plate 1 immediately beneath the saturating mechanism and in longitudinal alinement with the meeting surfaces of the feed-rollers is a transverse slot 34, upon either side of which are arranged the dies 35 and 36, which carry the tip-forming means and through which the lace passes after the tip has been formed. The die 35 is rigidly mounted upon the bed-plate and forms the stationary die with which the die 36, which is movable, coöperates to form the tip. This stationary die 35 comprises two horizontally-arranged plates 37 38, which are spaced apart from each other and arranged one above the other. Within the space formed between these two plates are pivoted at a point intermediate their ends, as at 38ª, a number of swinging or pivoted knives 39, the cutting portions of which project across the space between the dies and the slot in the bed-plate 1, the ends of the knives working in a groove 40, formed in the movable die 36. At their rear ends these knives are provided with elongated slots 41, as shown in dotted lines in Fig. 5, which are engaged by pins 42, projecting vertically from a longitudinally-reciprocating bar 43, arranged transversely of the machine and resting beneath the plate 37 and carrying antifriction-rollers 44 at its ends, one of which ends is adapted to be engaged by the cam 32 on the gear 26, so that the cutter-bar will be reciprocated in one direction to operate the knives to sever the lacing-string simultaneously with the molding of the tip. The pivoted knives are thrown out of contact with the lace ends in position to again sever the string by means of a cam 45 on the inner face of a revoluble disk 46, mounted on one end of the shaft 26ª, so that the bar 43 will be alternately moved back and forth as the shaft rotates and the ends of the bar 43 are engaged by the said cams 32 and 45.

As above mentioned, a peripheral cam 31 is carried by the gear-wheel 26, which is arranged to contact during its revolution with a roller 48, journaled on one end of the movable die 36, so as to move said die transversely across the face of the fixed die in a diagonal direction until it contacts the face of the fixed die, when it moves parallel thereto until the forming means carried by the dies, as hereinafter described, are brought together to form the tip. This movement of the die 36 will unseat the rollers 49, which are journaled on the ends of a tension-bar 50, which will ride the rollers out of the recess 51, formed in the rear face of said die, onto the cam-faces 36ª on the back of the die. This engagement of the spring tension-bar with the cam-faces on the die forces the die into engagement with the fixed die. The tension-bar 50 is pivotally mounted between two blocks 52 53, having inner curved faces 53ª in order to provide for the swing of said bar, the rear block being provided with adjusting-screws 54ª, by means of which the force exerted by the bar against the movable die is regulated. In order to prevent vertical displacement of the bar 50 from its position between the blocks 52 53, a retaining-plate 54 is provided, which is rigidly fastened to one of the rear blocks 52 and projects over the bar 50 and the block 53 and engages the top of the movable die to prevent vertical movement of said die.

The inner or engaging faces of the dies 36 37 carry the devices for forming the lace-tip from that portion of the string which has been saturated with the adhesive substance. These devices comprise projections 55, each of the projections on one die being formed at one side with a curved recess, while the projections on the opposing die are recessed on the side opposite to that of the projections on the first-named die, as shown in Fig. 5 of the drawings. By this arrangement of forming means when the movable die is moved toward the fixed die the projections 55 will be brought into engagement with each other with their recessed faces coinciding to grasp and compress the string to form a reduced portion which when severed forms the tip of a completed lace and of one which will be completed at the next operation of the machine. It will be seen that the lugs 55 on the movable die do not engage those on the fixed die which are directly opposite, but respectively engage the next but one opposite in the direction of its movement to compress the tip.

The movable die is moved back out of engagement with the stationary die by means of a cam 47 as the disk 46 revolves and is caused to assume the position shown in Fig. 5 for subsequent engagement and actuation by the cam 31 to force it toward the stationary die.

Mounted upon the upper faces of the dies are oppositely-curved devices 56, between which the lace-string passes in its course through the machine, said devices constituting guides for the string. These devices 56 also serve as releasing means for carrying or forcing the compressed portion of the lace out of engagement with the lug 55 on the dies and prevent their adhering thereto because of the adhesive powers of the substance or liquid with which the lace is saturated to form the tip. These devices 56 are so arranged that as the dies are operated to form the tip each device takes position to one side of a lug 55 on the opposite die, so that when the lace is released after having been compressed each device takes the tip portion out of the lug on the opposite die in rear of which it is placed during the tip-forming process.

In order to retract the die 36 after the tip has been formed, we provide a bowed expansive spring 58, which is arranged in a transverse slot 59, formed in the bottom face of the die 36, and has its respective ends fastened to the bed-plate 1, so as to normally hold said die in retracted position in engagement with the rollers on the end of the tension-bar. Rotary motion being imparted to the gear 26 by means of the shaft 28 and gear 27, the series of interrupted teeth 26ᵇ, which are in mesh with the gear 29, rotates said gear and the feed-roller 4, to which it is attached. The revolution of the feed-rollers feeds the tape to the machines and also determines the length of the lace according to the length of said series of gear-teeth, which of course is made longer, as heretofore described, accordingly as it is desired to increase the length of laces to be manufactured. As above stated, the saturating device is adjustable vertically with relation to the forming and cutting means to regulate the length of the lace, and it will be premised that in regulating the machine to manufacture laces of different lengths the adjustment of said saturating means must also be accompanied by an interchange of the gear 26 so that the length of lace fed by the feed-rollers will be equal to the distance between the saturating means and the forming and cutting means, the gear 26 being revolved until the interrupted or blank space in the series 29ᵇ reaches the gear 29, when the said rollers 4 and 5 will stand still during the time said blank space is passing the gear 29. While the feeding-rollers are standing still, the continued revolution of the gear 26 carries the pin 33 into engagement with the lever 23 on the platen-shaft 24, which lifts the said lever and throws the platen and saturating-pad into engagement with each other to saturate a portion of the lace. As soon as the pin 33 passes the end of the lever 23 the spring 25 returns the platen and pad to normal position, and the further revolution of the gear 26 brings the gear-teeth 26ᵇ into engagement with the gear 29, which feeds the tape downwardly to bring the saturated portion into position to be operated upon by the molding-dies. By the time the blank space in the gear 26 again reaches the gear 29 the cam 31 on said gear 26 comes into engagement with the roller 48 on the movable die 36 to move said die into engagement with the fixed die to mold the lace-tips, and at the same time the cam 32 engages the knife-bar 43 to operate the pivoted knives 39 to sever the lace-tips during the process of molding. The cam 31 being of considerable length, it will be seen that the saturated portion of the lace will be held long enough to have the tip well formed before the movable die is moved out of engagement with the fixed die. The shaft 25$^a$, upon which the gear 26 is arranged, continuing its rotation, the disk 46 turns with the said shaft and the cams 47 and 45 thereon engage the movable die and end of the cutter-bar, respectively, to return them to initial position, and the gear 26 continuing its motion causes the elements constituting the various mechanisms to repeat their operations in the manner as above described.

Having thus fully described the invention, what we claim as new, and desire to secure by Letters Patent, is—

1. In a lace-tipping machine, the combination of a feed mechanism, a saturating mechanism, and a cutting mechanism, said saturating mechanism being adjustably arranged with relation to the cutting mechanism.

2. In a lace-tipping machine, the combination of an oscillating platen and a saturating-pad movable into engagement with each other to saturate a lace.

3. In a lace-tipping machine, the combination of the oscillating platen, a liquid-receptacle and a saturating-pad movably arranged in the receptacle, said platen and pad being movable into engagement with each other to saturate a lace.

4. In a lace-tipping machine, the combination of a platen, a liquid-receptacle, a saturating-pad movably arranged in the receptacle and means to move the platen and pad into engagement with each other to saturate a lace.

5. In a lace-tipping machine, the combination of a feeding mechanism, a liquid-receptacle, a platen, a saturating-pad coöperating with the platen, said platen and pad being movable into engagement with each other to saturate a lace, and a cutting mechanism.

6. In a lace-tipping machine, the combination of an oscillating platen, a saturating-pad, and means for intermittently moving the platen and pad into engagement with each other to saturate a lace.

7. In a lace-tipping machine, the combination of an oscillating platen, a liquid-tank, a saturating-pad pivotally mounted in the tank and means connecting the platen and pad whereby they are simultaneously moved into engagement with each other to saturate a lace.

8. In a lace-tipping machine, the combination of an oscillating platen, a liquid-receptacle and a saturating-pad pivotally mounted in the receptacle, an arm on the pad and a lever mounted on the platen and engaging said arm.

9. In a lace-tipping machine, the combination of an oscillating platen, a liquid-receptacle, a shaft journaled in the receptacle, a saturating-pad on the shaft, an arm on the shaft, and a lever mounted on the platen and engaging said arm.

10. In a lace-tipping machine, the combination of a fixed die, a movable die, tip-forming means carried by the dies, and lace-cutting devices carried by the fixed die.

11. In a lace-tipping machine, the combination of a fixed die, a movable die, tip-forming means carried by the dies, lace-cutting means on the fixed die, and means carried by the dies for releasing the lace from the tip-forming means.

12. In a lace-tipping machine, the combination of a fixed die, a movable die, tip-forming means carried by the dies, lace-cutting knives pivoted on the fixed die, and means for actuating the knives, and the dies.

13. In a lace-tipping machine, the combination of a fixed die, a movable die, tip-forming means carried by the dies, lace-cutting knives carried by the fixed die, means connecting the knives, and means for actuating said last-named means for actuating the knives.

14. In a lace-tipping machine, the combination of a fixed die, a movable die, tip-forming means carried by the dies, lace-cutting knives pivoted on the fixed die and means for actuating said knives.

15. In a lace-tipping machine, the combination of a fixed die, a movable die, tip-forming means carried by the dies, lace-cutting knives pivoted on the fixed die, a bar connecting the knives, and means for reciprocating the bar to actuate the knives.

16. In a lace-tipping machine, the combination of a fixed die, a movable die, tip-forming means carried by the dies, lace-cutting knives pivoted on the fixed die, a bar connecting the knives, and a cam for reciprocating the bar to actuate the knives.

17. In a lace-tipping machine, the combination of a fixed die, a movable die, movable transversely of and toward and away from the fixed die, and means to actuate the movable die to coöperate with the fixed die to form a tip.

18. In a lace-tipping machine, the combination of a fixed die, a movable die, tip-forming means carried by the dies, cutting-knives on the fixed die, means to actuate the knives, and a spring device for forcing the movable die toward the fixed die.

19. In a lace-tipping machine, the combination of a fixed die, a movable die, tip-forming means carried by the dies, a spring tension device and a cam coöperating to force the movable die into engagement with the fixed die, and means for retracting the movable die after the lace-tip has been formed.

20. In a lace-tipping machine, the combination of a fixed die, a movable die, tip-forming means carried by the dies, means on the dies for moving the lace out of contact with the tip-forming means, and means to move the movable die transversely of the fixed die.

21. In a lace-tipping machine, the combination of a fixed die, a movable die, tip-forming means carried by the dies, cam-faces on the rear face of the movable die, means to move the movable die transversely of the fixed one, and a spring tension device engaging the cam-faces to throw the dies into engagement to form a lace-tip.

22. In a lace-tipping machine, the combination of a rotary feeding mechanism, an oscillating saturating mechanism, reciprocating tip-forming dies, and pivoted cutting-knives.

23. In a lace-tipping machine, the combination of an intermittent feed mechanism, a saturating mechanism, and a cutting mechanism, the said saturating mechanism being adjustable with relation to the tip-forming mechanism to regulate the length of the lace.

24. In a lace-tipping machine, the combination of an intermittent feed mechanism, a saturating mechanism to saturate the lace, dies carrying a tip-forming means, a lace-cutting means carried by the dies, and means to actuate the cutting means simultaneously with the forming of the tip.

25. In a lace-tipping machine, the combination of a feeding mechanism, a saturating mechanism and a tip-forming mechanism, the said saturating mechanism being adjustable with relation to the tip-forming mechanism to regulate the length of the lace.

26. In a lace-tipping machine, the combination of a platen, an adhesive-receptacle having an outlet therefrom and means within the receptacle adapted to be projected through said outlet to coöperate with the platen to apply the adhesive to the lace.

27. In a lace-tipping machine, the combination with a pair of opposing tip-forming dies, one of which is rigid, of oscillating knives carried by the rigid die for severing the tape, and means for supplying stiffening material for the tips.

28. In a lace-tipping machine, the combination with means for feeding a definite length of tape, of an oscillating device and a pad coacting to supply adhesive material to the tape, a tip-former, and knives for severing the tape so as to form tips of equal dimensions.

29. In a lace-tipping machine, the combination of means for feeding a definite length of tape, a device for applying adhesive material to the tape, a pair of opposing dies carrying tip-forming means, one of said dies being reciprocable, and knives.

30. In a lace-tipping machine, the combination with a feed means and mechanism for applying adhesive material to a tape, of a pair of dies, means for actuating them to form the tip of a lace, and a tension device for normally keeping the dies apart.

31. In a lace-tipping machine, the combination of a fixed die, a movable die, a tip-forming means carried by the dies, and cutting devices arranged to sever the tip while it is being formed.

32. In a lace-tipping machine, the combination with tip-forming dies, of devices carried thereby to move the tip out of engagement therewith.

33. In a lace-tipping machine, the combination of a fixed die, a movable die, tip-forming means on the dies, and devices carried by the dies for releasing the lace from the tip-forming means.

34. In a lace-tipping machine, the combination of a fixed die, a movable die, tip-forming means on the dies, knives on the fixed die, means to actuate the knives, and means for forcing the movable die toward the fixed die.

35. In a lace-tipping machine, the combination of an oscillating platen, a saturating device, and means for moving the platen and device into engagement with each other to saturate a lace.

36. In a lace-tipping machine, the combination of a platen, a liquid-receptacle, a saturating device arranged within the receptacle, and means for moving said platen and device into engagement with each other to saturate a lace.

37. In a lace-tipping machine, the combination of a platen, a liquid-receptacle, a saturating device movably arranged in the receptacle, and means for moving the platen and device into engagement with each other to saturate a lace.

38. In a lace-tipping machine, the combination of a feed mechanism, a saturating mechanism, a tip-forming means, and a cutting means, said saturating mechanism being adjustable with relation to the forming and cutting means.

39. In a lace-tipping machine, the combination of a platen, and a saturating-pad arranged to be moved into engagement with each other to saturate a lace.

40. In a lace-tipping machine, the combination of a movable platen, and a saturating-pad arranged to be moved into engagement with each other to saturate a lace.

41. In a lace-tipping machine, the combination of a platen, a saturating-pad, and means to move said platen and pad into engagement with each other to saturate a lace.

42. In a lace-tipping machine, the combination of an oscillating platen, a liquid-receptacle, a shaft journaled in the receptacle, a saturating-pad on the shaft, an arm on the pad having a slot, and a lever mounted on the platen and carrying a pin engaging the slot in said arm.

43. In a lace-tipping machine, the combination of a feed means, an oscillating platen, a saturating-pad, means engaging said platen and pad, an arm on the platen, a gear-wheel to operate the feed means, and a pin on said gear to engage said arm to throw the platen and pad into engagement with each other.

44. In a lace-tipping machine, the combination of a movable platen, a saturating-pad, means to move said platen and pad into contact with each other to saturate a lace, and means to return them to their normal position.

45. In a lace-tipping machine, the combination of a feed means, an oscillating platen, a saturating-pad, means engaging said platen and pad, an arm on the platen, a gear-wheel to operate the feed means, a pin on said gear to engage the arm on the platen to move the platen and pad into engagement with each other, and a spring to return them to normal position.

46. In a lace-tipping machine, the combination of a movable platen, a saturating-pad, and tip-forming dies, one of which is reciprocable.

47. In a lace-tipping machine, the combination of a platen, a saturating-pad, and tip-forming means.

48. In a lace-tipping machine, the combination of feeding means, a platen, a saturating-pad, means to move the platen and pad into contact, tip-forming means, and cutting means.

In testimony whereof we affix our signatures in presence of two witnesses.

OSCAR A. ALBRECHT.
THEODORE L. RINGWALT.

Witnesses:
MAUDE I. WALLACE,
CHAS. D. BICKETT.